June 28, 1966 K. G. HUBBARD 3,257,706
AUTOMATIC IN-LINE TRANSFER MACHINE
Filed June 4, 1963 21 Sheets-Sheet 4

Inventor
Kenneth George Hubbard
BY
Scrivener and Parker
Attorneys

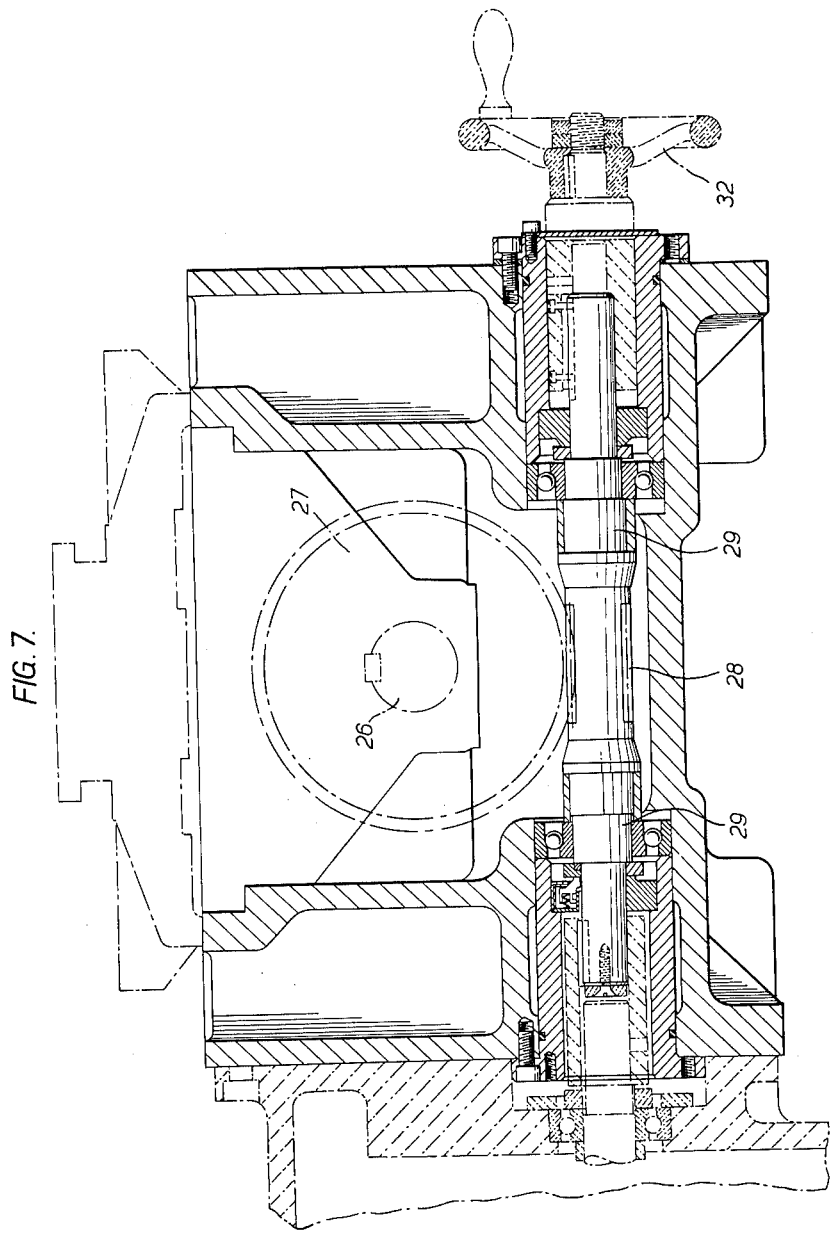

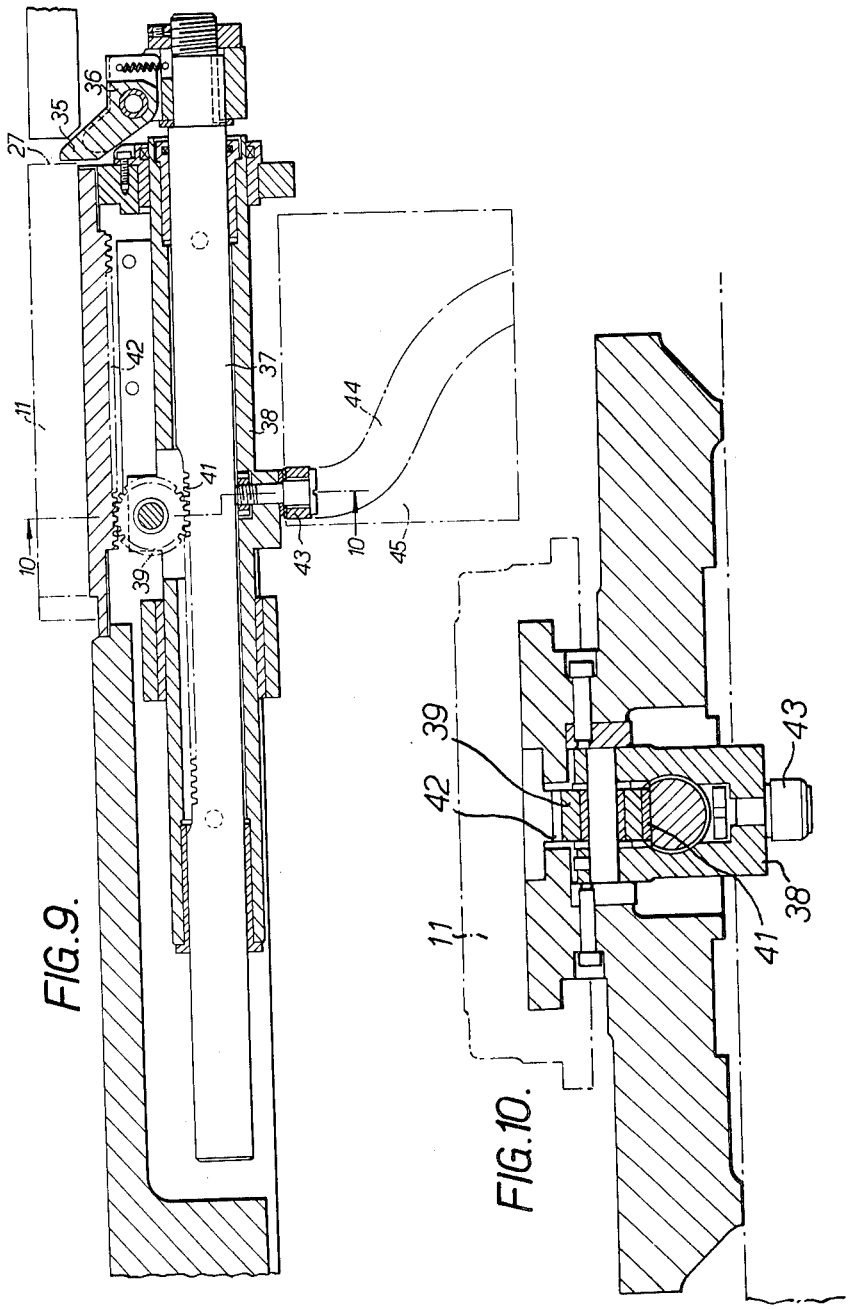

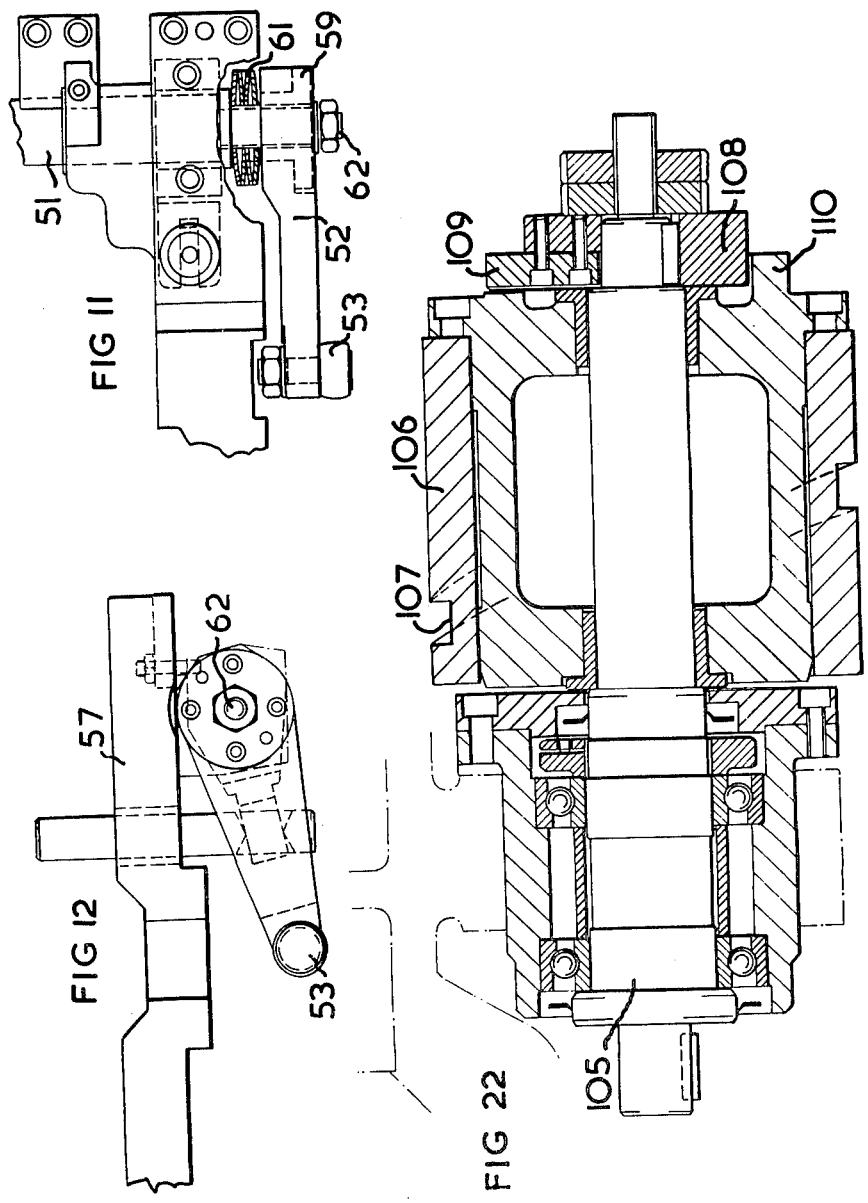

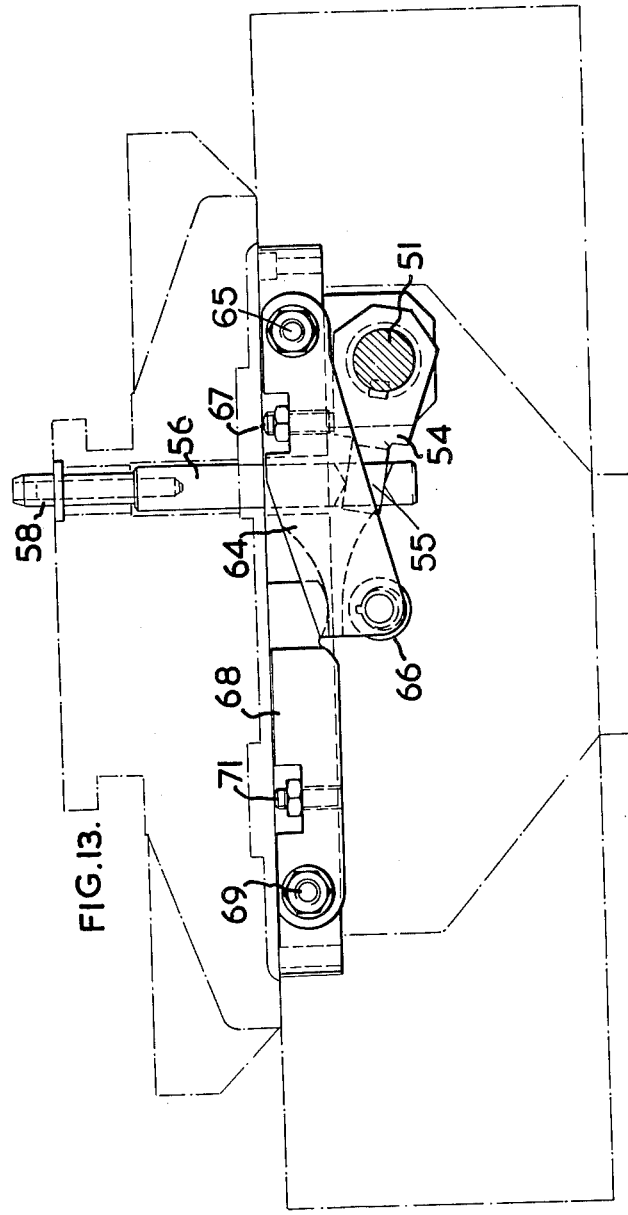

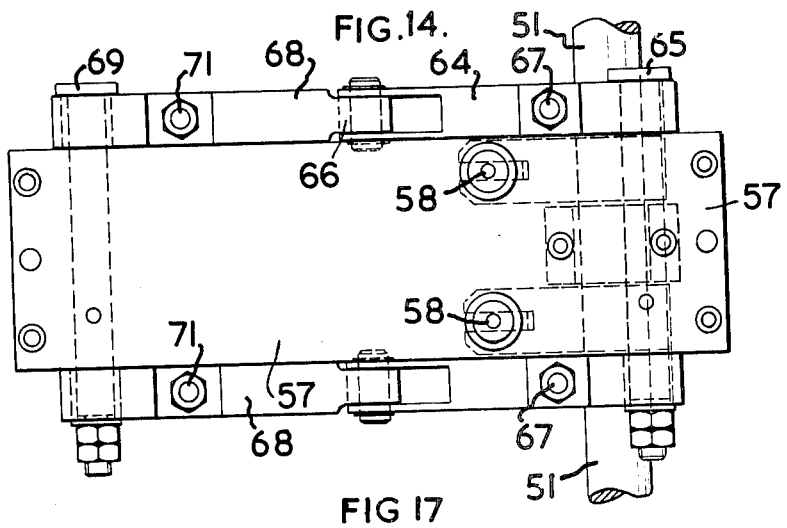
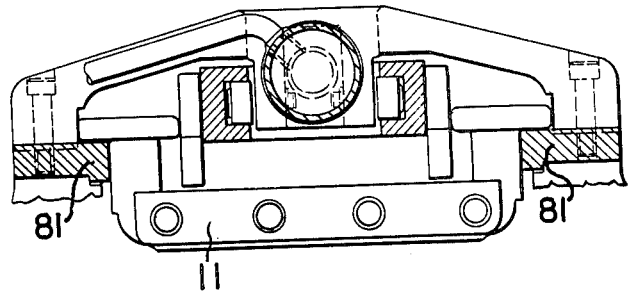
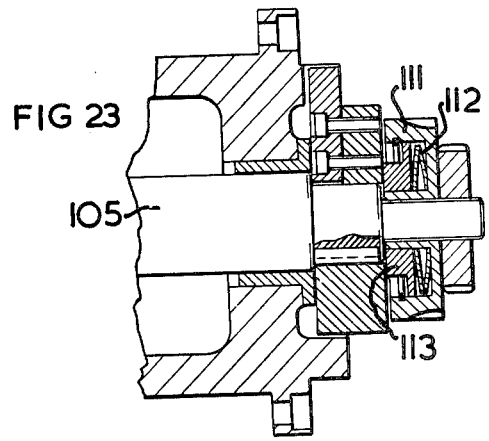

June 28, 1966 K. G. HUBBARD 3,257,706
AUTOMATIC IN-LINE TRANSFER MACHINE
Filed June 4, 1963 21 Sheets-Sheet 11

Inventor
Kenneth George Hubbard
BY
Scrivener and Parker
Attorneys

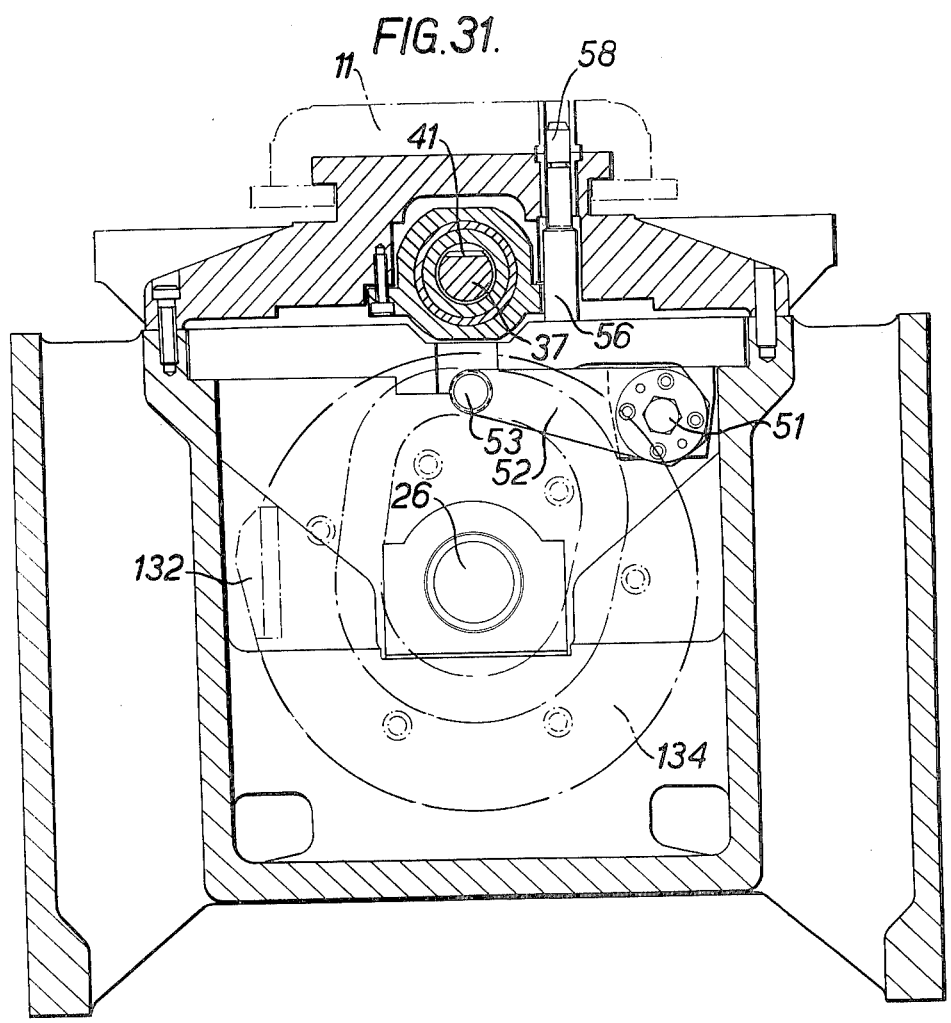

United States Patent Office 3,257,706
Patented June 28, 1966

3,257,706
AUTOMATIC IN-LINE TRANSFER MACHINE
Kenneth George Hubbard, Shrewsbury, England, assignor to Renault Machine Tools (U.K.) Limited, Shrewsbury, England, a British company
Filed June 4, 1963, Ser. No. 285,304
Claims priority, application Great Britain, June 5, 1962, 17,368/62
10 Claims. (Cl. 29—33)

This invention relates to a new or improved in-line transfer machine.

One of the objects of our invention is to provide a machine which can be supplied as a complete compact unit ready for tooling, and which can be used for carrying out a wide variety of machining operations on articles or components.

Basically, an in-line transfer machine according to our invention comprises a series of work-receiving platens movable successively step by step from a loading point between spaced rows of slides movable towards and away from the platens, together with means for returning the platens to the loading point and means for automatically locating and clamping each platen in successive longitudinally spaced positions while operations are being performed on a work-piece carried by it, all the movements of the platens and slides being controlled by a common shaft so that the movements are synchronised and interlocked.

The machine preferably also includes means for automatically removing and disposing of swarf and for cleaning the platens as they return to the loading point.

Independently driven unit heads of any convenient kind can be mounted on each of the slides for carrying out successive operations on the work-pieces while the platens are stationary, the drives for the tools being started and stopped by limit switches actuated by the movements of the slides which may be arranged to provide a fast forward movement of the tool up to the work followed by a relatively slow feed stroke and a fast return.

Means are preferably provided for turning the main shaft by hand for tool setting, which is thus considerably facilitated, the drive including an indicator showing the angular position of the shaft.

At each station, the platens are rigidly located and clamped by means which are actuated by cams and of which the clamping pressure can be readily set by the operator.

One practical form of transfer machine in accordance with our invention is illustrated by way of example in the accompanying drawings in which:

FIGURE 7 is a transverse section showing the drive for the main shaft;

FIGURE 9 is a fragmentary longitudinal section showing the mechanism for moving the platens longitudinally step-by-step on each cycle of the machine;

FIGURE 10 is a transverse section on the line 10—10 of FIGURE 9;

FIGURE 11 is a fragmentary plan of the drive for the mechanism for locating the platens in each operative position;

FIGURE 12 is an end view of the mechanism shown in FIGURE 11;

FIGURE 13 is an end view of the mechanism for clamping one of the platens in its operative position;

FIGURE 14 is a plan of the mechanism shown in FIGURE 13;

FIGURE 16 is a side elevation of a portion of the lower part of the base of the machine showing the mechanism for returning the platens to the loading point;

FIGURE 17 is a fragmentary section on the line 17—17 of FIGURE 16;

FIGURE 18 is a side elevation in part section of the mechanism at the loading end of the machine for bringing up a returned platen into alignment with the guides on which the platen moves through its operative positions;

FIGURE 19 is an end view of the angularly movable claw;

FIGURE 31 is a cross-section of the machine showing the co-operation between the face cam and the means for locating the platens.

In the machine illustrated, 10 is the base or bed of the machine which has on its upper surface spaced parallel longitudinal guides on which aligned platens 11 are adapted to slide. The platens carry the work-pieces or blanks which will normally be held in jigs secured to the platens.

Figure 1:
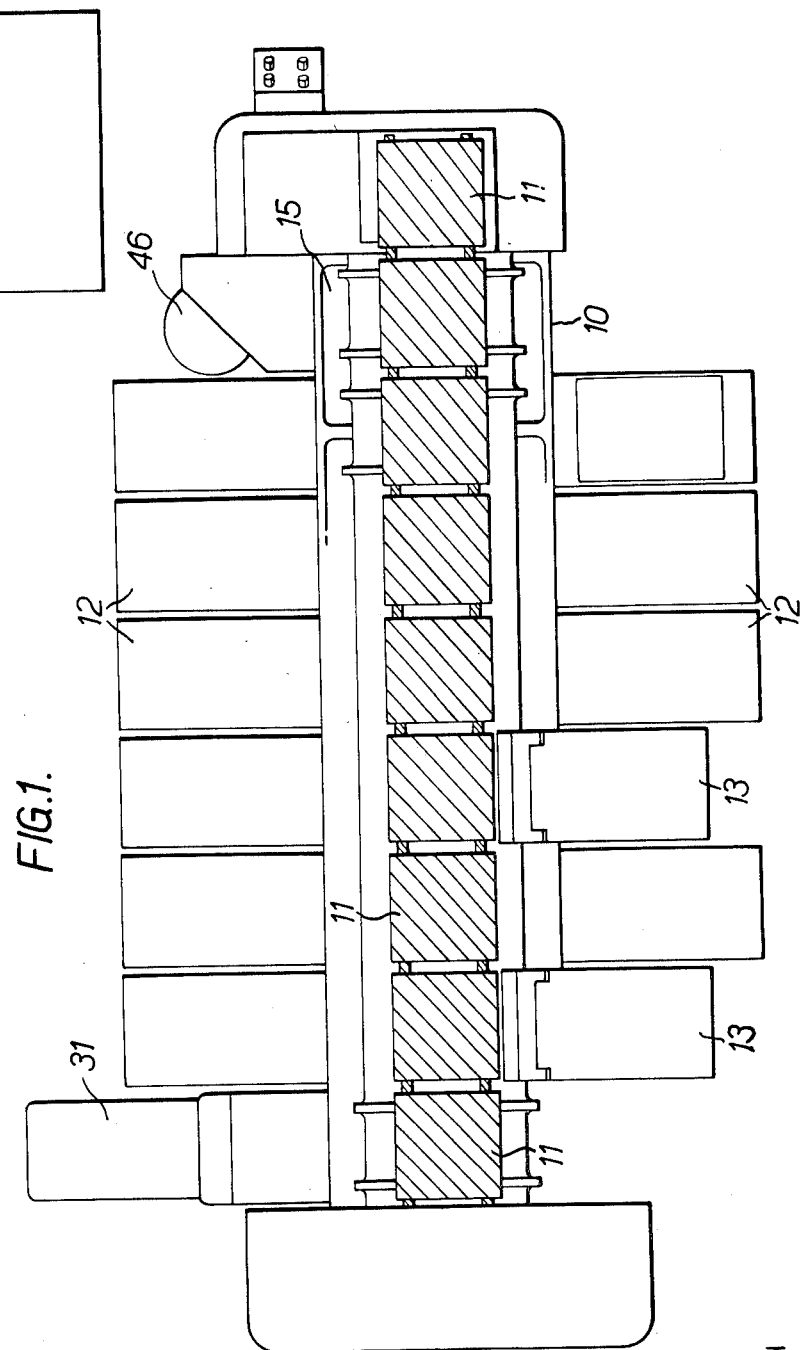
FIGURE 1 is a diagrammatic plan of the complete machine.
Figure 2:
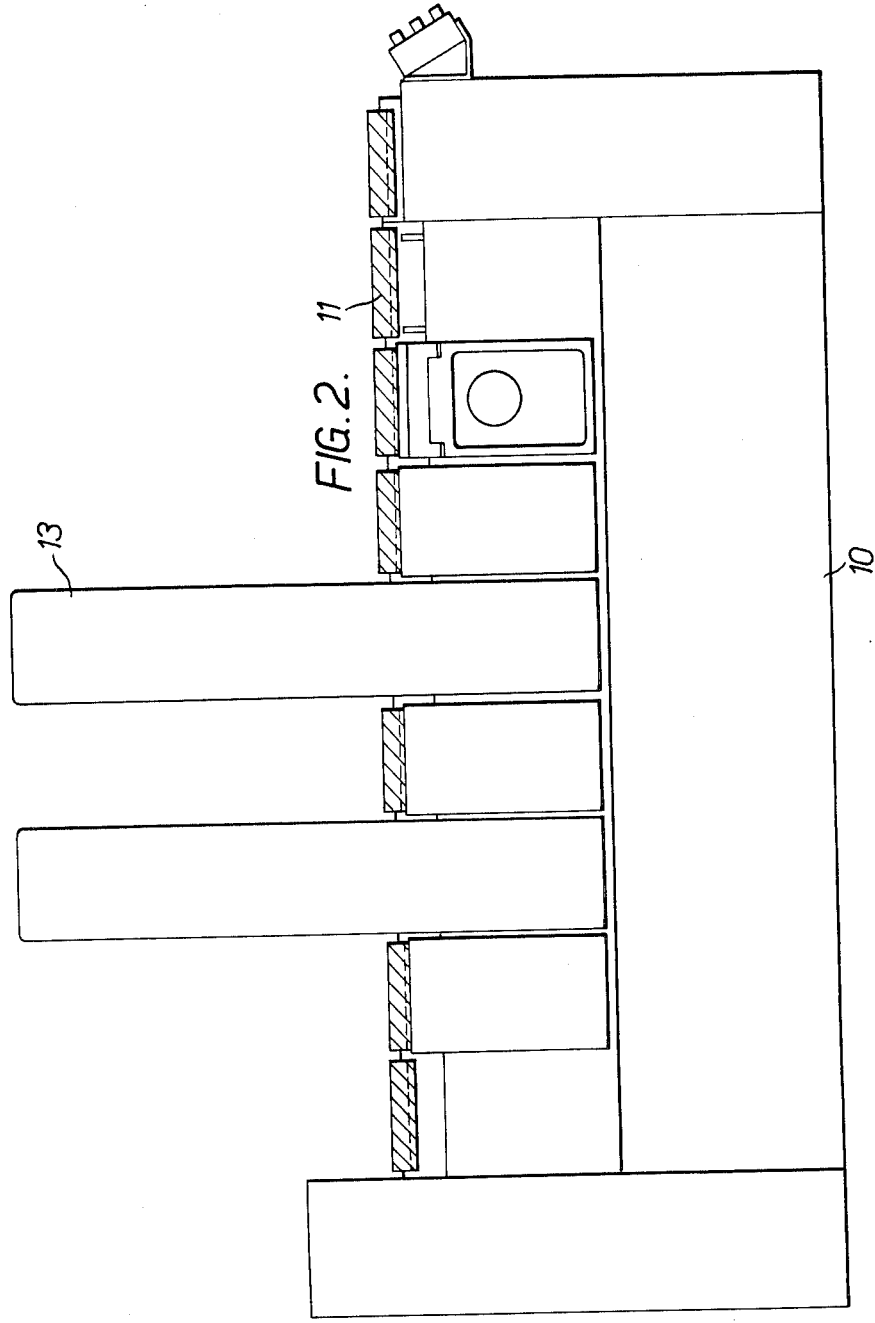
FIGURE 2 is a diagrammatic side elevation.
Figure 3:
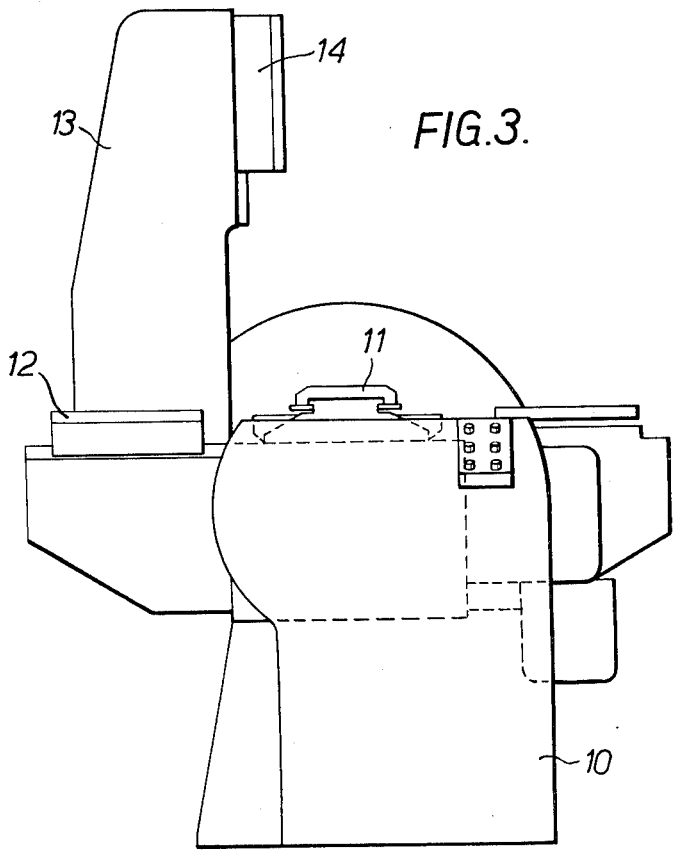
FIGURE 3 is a diagrammatic end view.

The platens travel between two opposed rows of horizontal slides 12 which are movable towards and away from the platens by means driven from the main shaft of the machine, and are adapted to carry unit heads of any desired type for carrying out operations on the work-pieces. In FIGURES 1, 2 and 3 some of the slides are shown carrying columns 13 having vertical slides 14 to receive vertically movable unit heads.

The platens are moved step-by-step between stations in alignment with opposed slides by mechanism which is described in detail below, the platens being automatically located and clamped in each position while operations are carried out on the work-pieces.

Work-pieces are loaded on to the platens at the right hand end of the machine as shown in FIGURE 1. The various operations have been completed by the time a platen reaches the other end of the machine where the work-pieces are unloaded. As the platen reaches the end of its travel, it is moved clear of the longitudinal guides and into engagement with an angularly movable claw which moves it to a lower level, inverts it, and brings it into engagement with means described below which return it through the base of the machine to the right hand end where similar mechanism picks it up and returns it to the loading position from which it moves again into engagement with the longitudinal guides.

Figure 4:
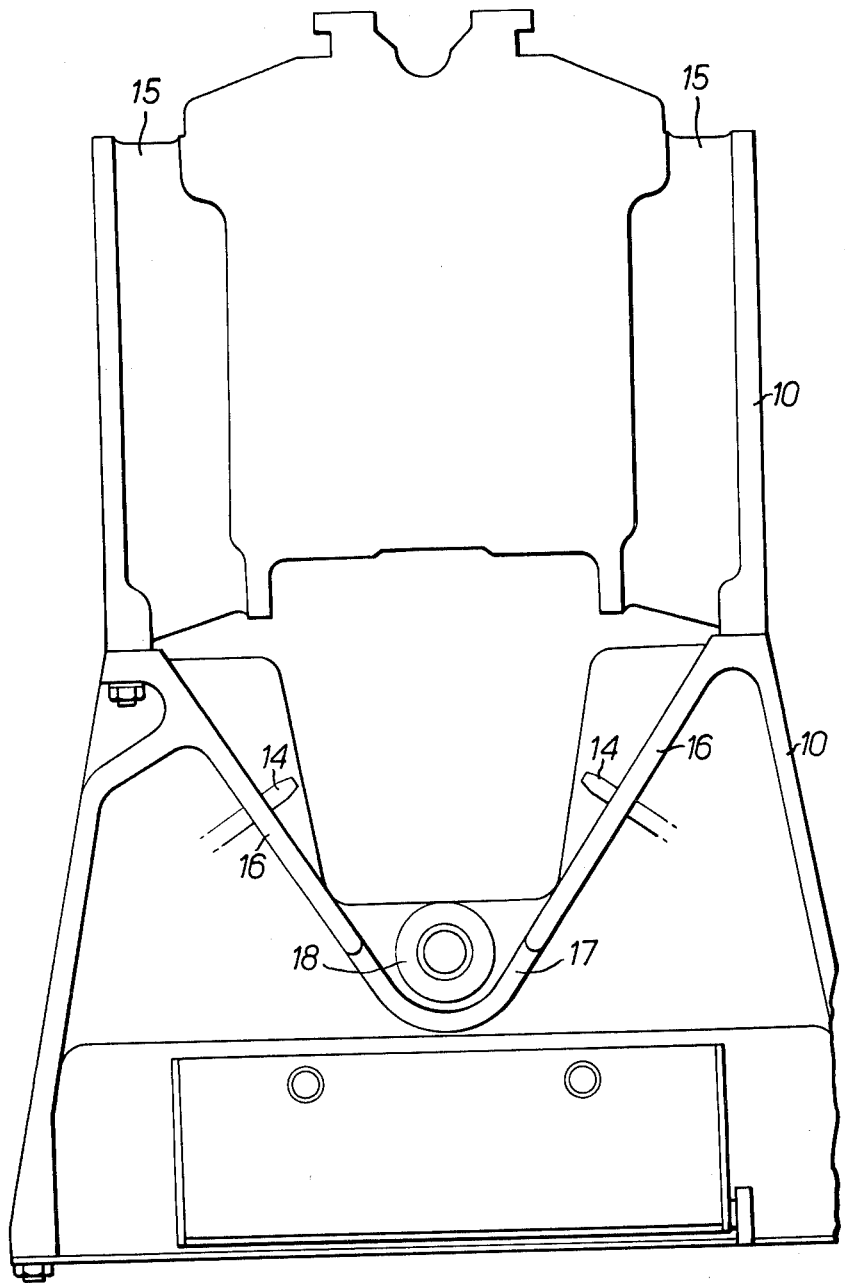
FIGURE 4 is a transverse section of the base or bed of the machine.

As the platens return through the base of the machine they are washed by jets of coolant from nozzles 14 seen in FIGURE 4.

Disposal of swarf is always a problem in multiple transfer machines, and in our machine this difficulty is overcome by providing in the upper surface of the base between the guides for the platens and the slides a series of longitudinal openings 15 to receive swarf. From these openings the swarf passes downwardly between oppositely inclined internal walls 16 in the base to a channel 17 in which is mounted a continuously driven Archimedean screw conveyor 18 which feeds the swarf along and delivers it into a collecting bin or the like at one end of the machine. The channel 17 also collects any swarf washed from the platens.

In an alternative method of operation the work-pieces may be loaded and unloaded at the same end of the machine in which case the work-pieces are carried back through the base with the platens.

Figures 5, 6:
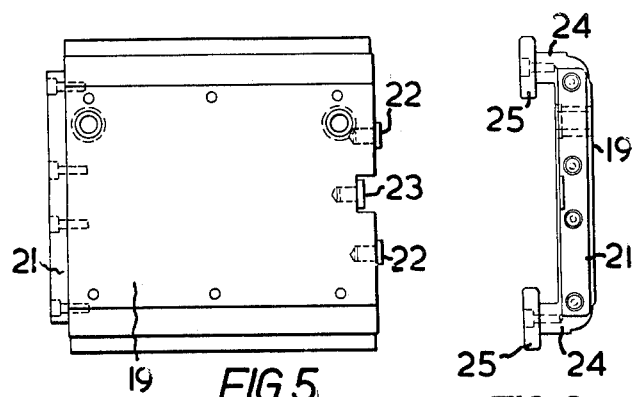
FIGURE 5 is a plan of a platen.
FIGURE 6 is an end view of a platen.

A typical platen is shown in FIGURES 5 and 6. The platen 19 is conveniently formed as a casting and has a flat ground upper face to receive a work-piece or a jig in which a work-piece is held. A hardened plate 21 is secured to one end of the platen and spaced studs 22 are screwed into the other end, and the plate and studs are ground after assembly to the plate to exact length and parallelism. A further stud 23 is inset into the center of the same end of the platen as the studs 22 for engagement by the means described below for moving the platens longitudinally. On its underside the platen has at each side a depending rib 24 to which is secured a flange or runner 25 projecting both inwardly and outwardly from the rib.

Figure 8:
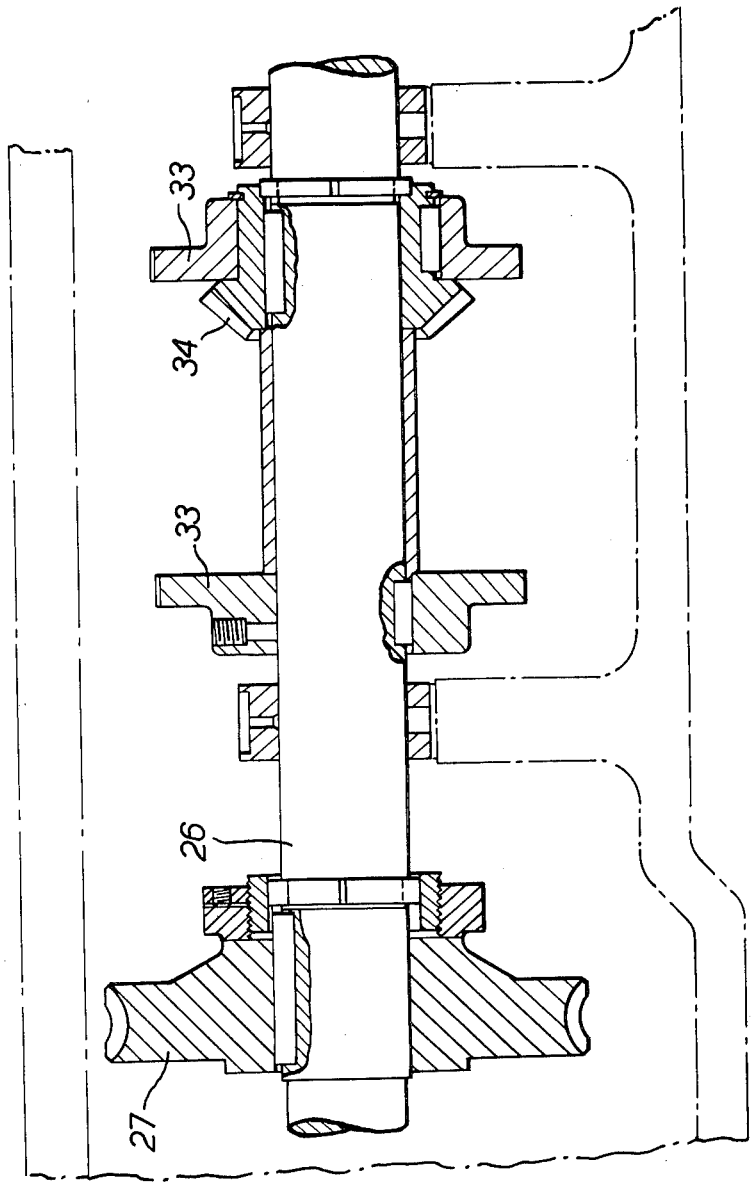
FIGURE 8 is a side elevation of a portion of the main shaft.

The movements of the platens and slides are effected or controlled by a main drive shaft 26 (FIGURES 7 and 8) which extends longitudinally through the machine and is driven through a worm-wheel 27 by a worm 28 on a transverse shaft 29 located at one end of the machine. The shaft 29 is driven through any convenient form of change-speed gearing from a main driving motor 31 seen in FIGURE 1.

For tool-setting the shaft 29 can be rotated manually by a hand-wheel 32 which is slidably engaged with one end of the shaft and can be removed when the machine is in normal operation.

At intervals along its length, corresponding to the stations of the platens, the main shaft 26 carries cams 33 for clamping the platens in their various stations and bevel gears 34 for driving laterally extending shafts which carry cams for operating the tool slides as described below.

The main shaft 26 makes one complete revolution for each cycle of the machine.

The mechanism for moving the platens step-by-step between successive stations is located at the loading end of the machine and is shown in FIGURES 9 and 10.

Figure 30:
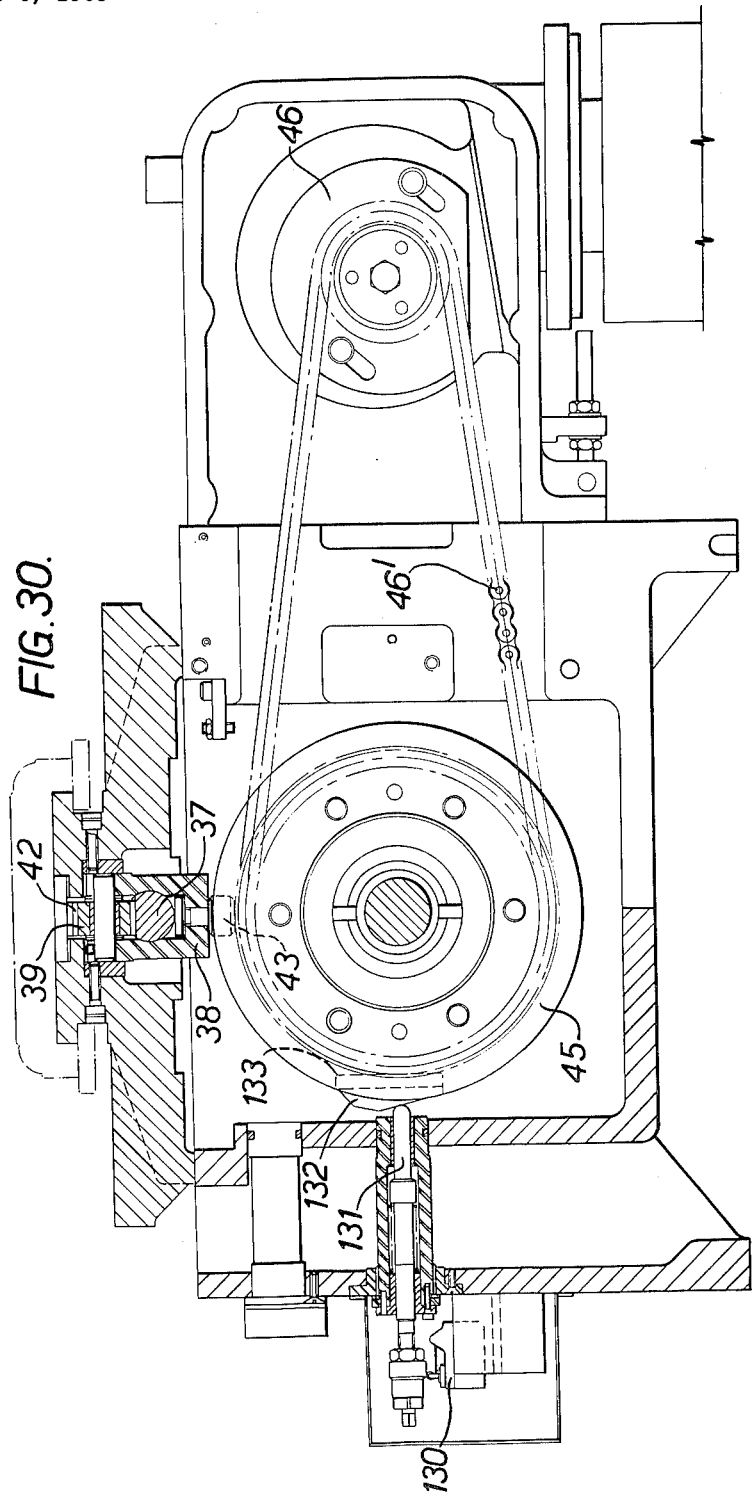
FIGURE 30 is a cross-section of the machine showing the drive for the drum cam and the control switch for the drive.

The movement of the platens is effected by a spring-loaded finger 35 pivotally mounted on a lug 36 on one end of a spindle 37 which is slidably mounted in a bore in a longitudinally guided carriage 38. A pinion 39 is rotatably mounted in a gap in the upper surface of the carriage and meshes with a rack 41 on the spindle 37 and with a parallel stationary rack 42. On its underside the carriage carries a roller 43 engaging in a cam track 44 in a drum 45 which is rotatably mounted on the main shaft and which, on the closing of a switch by a cam or finger on the main shaft, is rotated through one complete revolution by a chain drive 46 from a separate index motor 46 seen in FIGURE 30.

The travel imparted to the carriage by the drum cam is equal to half the required travel of the platens but the carriage, through the rack and pinion mechanism, imparts to the spindle 37 and hence to the finger 35 a forward and return movement equal to twice that of the carriage.

When the drum 45 is rotated by the indexing motor the finger 35 is first moved to the right and rocks over to ride under a platen A which has been brought up by an angularly movable claw as described below into alignment with the platen guides. The finger then swings up and engages the outer end of the platen and, after a dwell produced by the contour of the cam groove in the drum in order to give time for the platen locating and clamping means to be released, the finger moves inwardly and moves the platen forwardly into engagement with the guides. The platens on the guides are all in contact with each other so that the forward movement of the end platen moves all the platens forwardly through the same distance. When the drum has completed a revolution the index motor 46 is stopped by a limit switch 130 which is actuated through a slidably mounted plunger 131 by a trip projection 132 mounted in a recess 133 in a face cam 134 secured to one end of and rigid with the drum 45.

The face cam 134 actuates means for locating all the platens in their operative stations. This mechanism is shown in FIGURES 11, 12 and 13. A shaft 51 extending longitudinally within the machine parallel to the main shaft has on one end a lever arm 52 on the free end of which is a roller 53 cooperating with a groove 50 in the face of the cam 134. At each platen station the shaft has fixed to it two spaced arms 54 having on their free ends tongues 55 engaging in slots in plungers 56 guided for vertical movement in a stationary cross plate 57.

Location plungers 58 (FIGURE 13) are screwed into the upper ends of the plungers 56 and when the shaft 51 is moved angularly, which is timed to take place immediately after the platens have been moved into their new stations as described above, the location plungers 58 are projected upwardly into openings in a platen.

To avoid the possibility of damage to the mechanism if the openings in the platens do not come into accurate alignment with the locating plungers, or if there is any other obstruction to the movement of the plungers, the lever arm 52 is not directly keyed to the shaft 51, but is mounted on a nut 59 which is in screw-threaded engagement with the end of the shaft, the thread being of coarse pitch. The nut is loaded axially by Belleville washers 61 which cause the shaft normally to move angularly with the lever arm, but if there is any obstruction to the movement of any of the locating plungers the nut will slip on the screw-thread and damage to the mechanism will be prevented. On the return of the lever arm to its normal position, the nut will rotate on the shaft until it abuts against a washer and stop-nut 62 on the end of the shaft which locates the lever arm and shaft in their correct angular positions so that no re-setting is required. If the nut moves outwardly on the shaft owing to an obstruction to the movement of the plunger, it operates a limit switch (not shown) which stops the machine.

Figure 15:
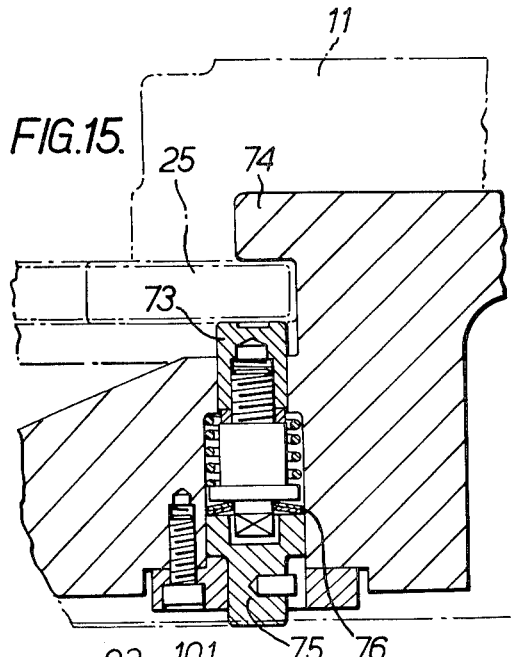
FIGURE 15 is a section on a larger scale of one of the clamps.
Figure 20:
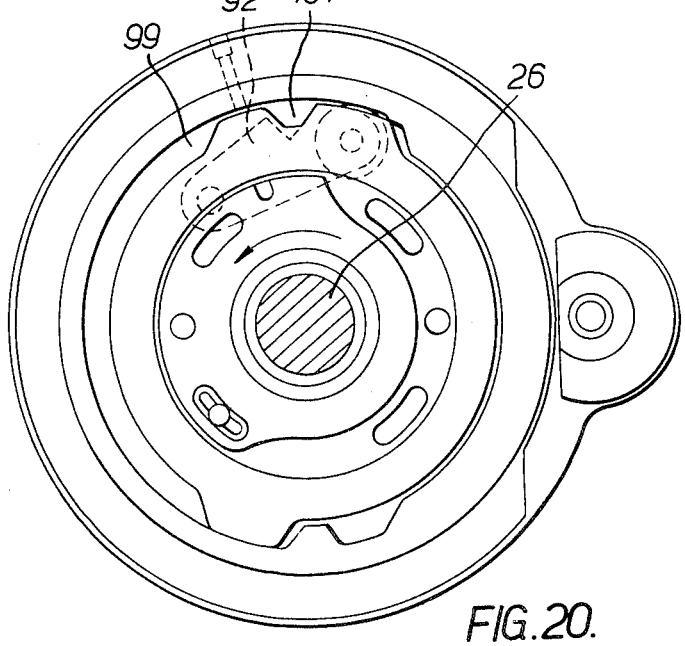
FIGURE 20 is a section on the line 20—20 of FIGURE 18 looking to the right.
Figure 21:
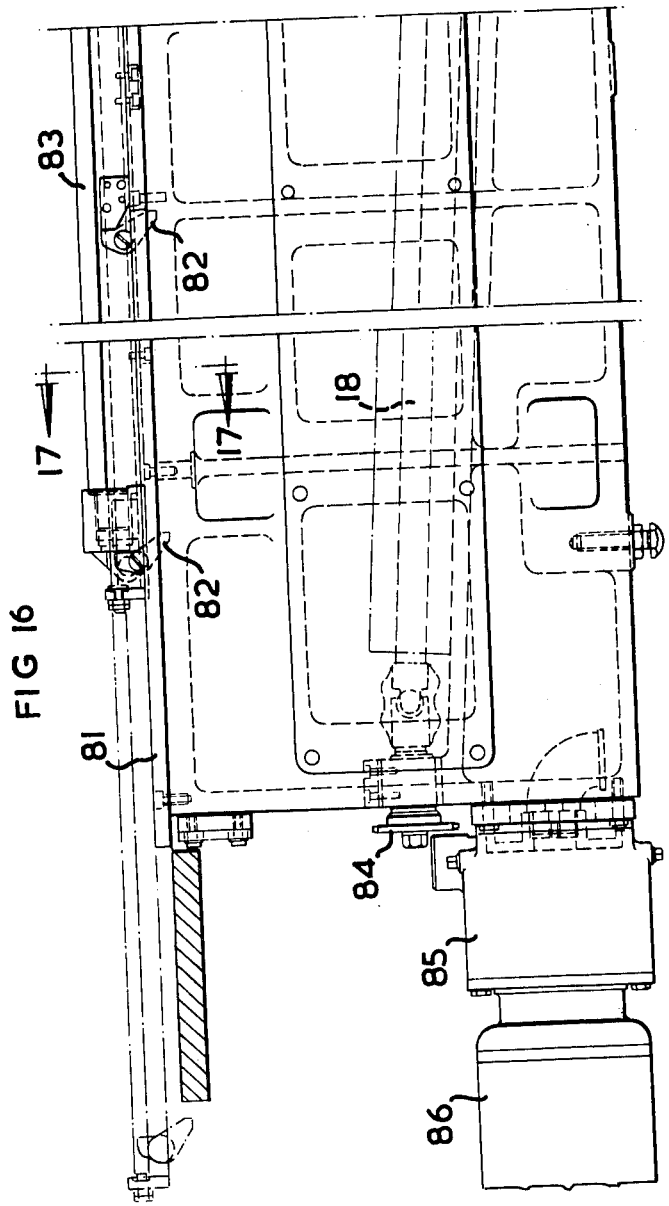
FIGURE 21 is a section on the same line looking to the left.

In addition to being located by the plungers, the platens at each station are positively clamped to the guides by the means shown in FIGURES 13, 14 and 15.

Figure 26:
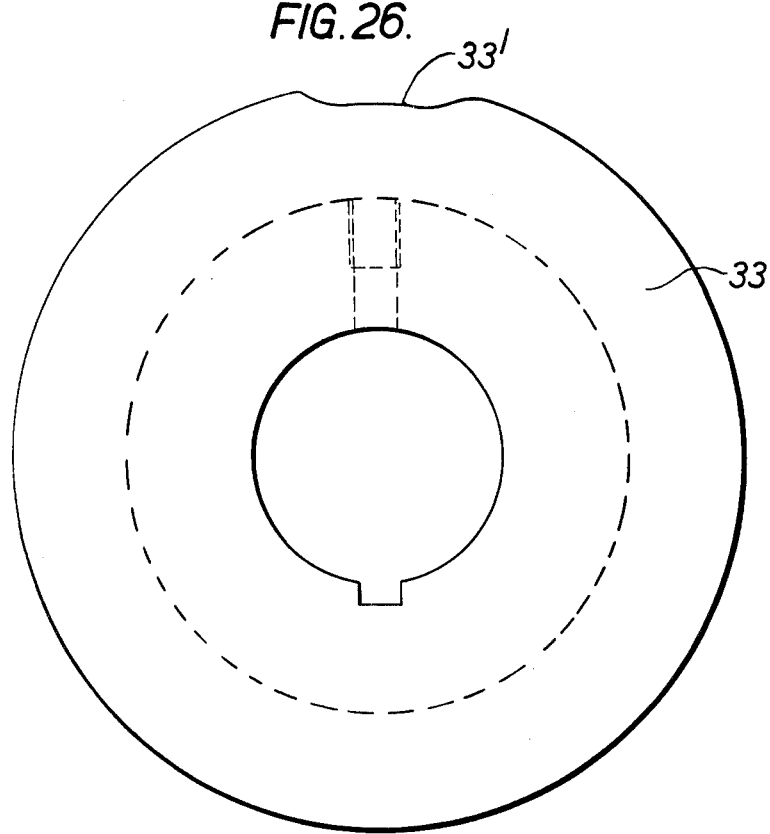
FIGURE 26 is an end view of one of the cams on the main shaft for clamping the platens in their operative stations.
Figure 27:
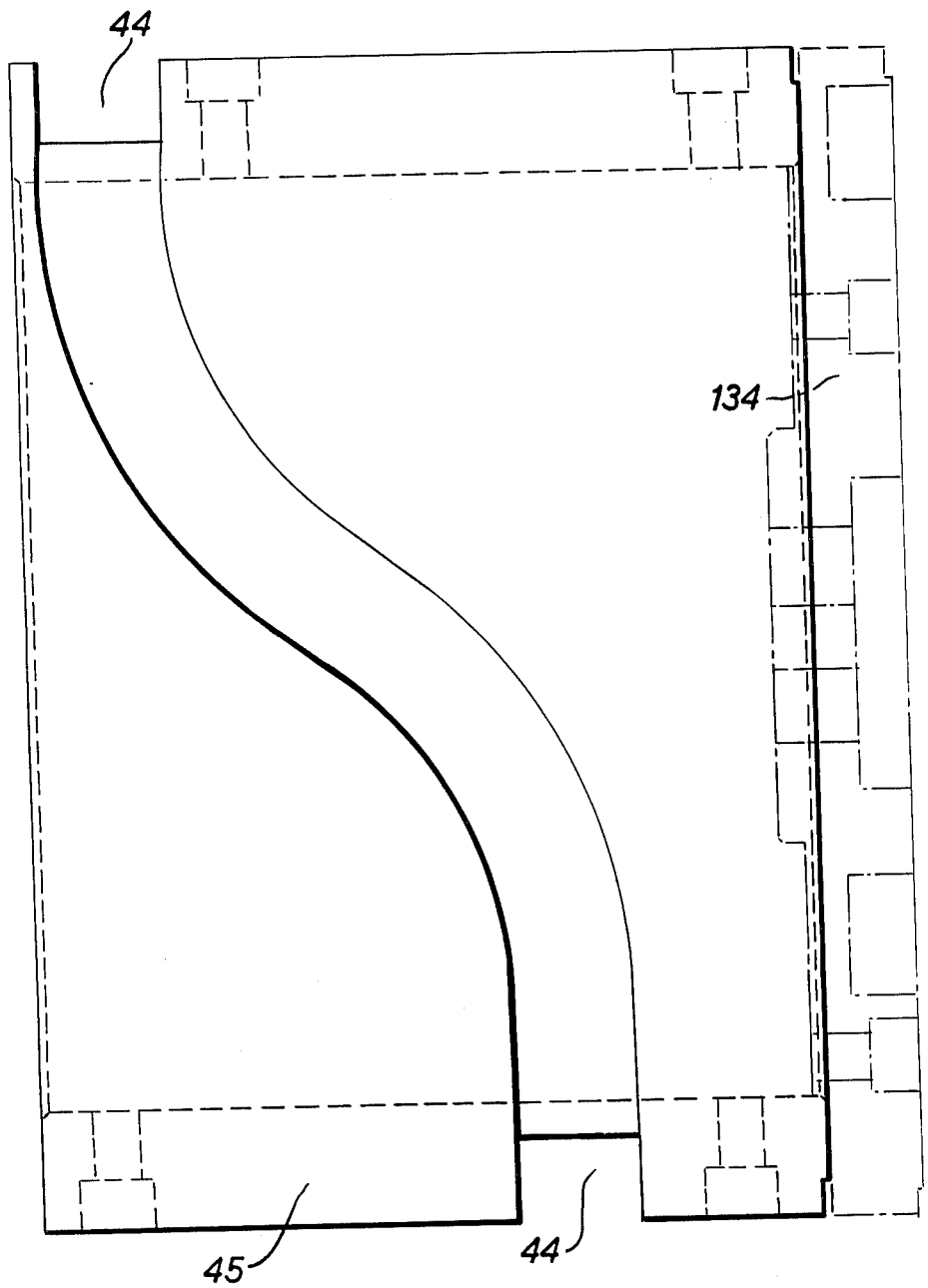
FIGURE 27 is a side elevation of the drum cam which actuates the means for feeding the platens step-by-step.
Figure 28:
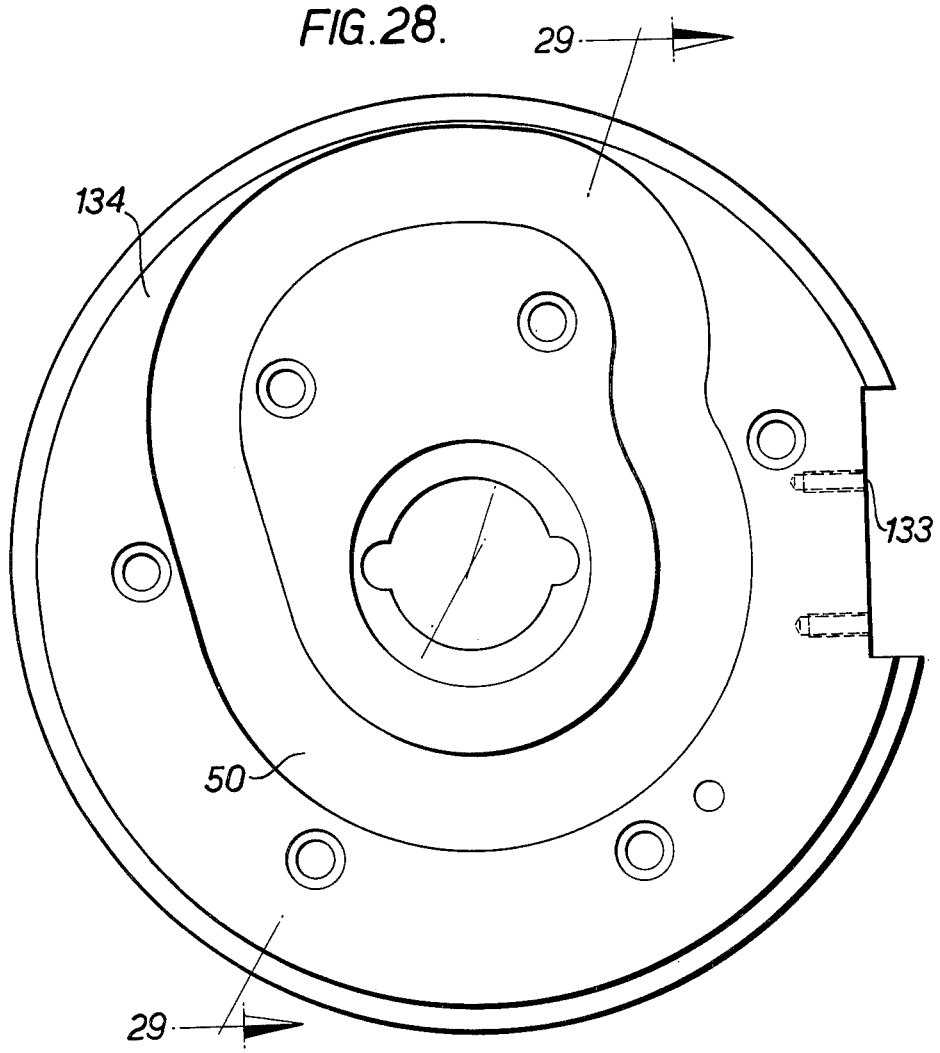
FIGURE 28 is an end view of the face cam which actuates means for locating the platens in their operative positions.
Figure 29:
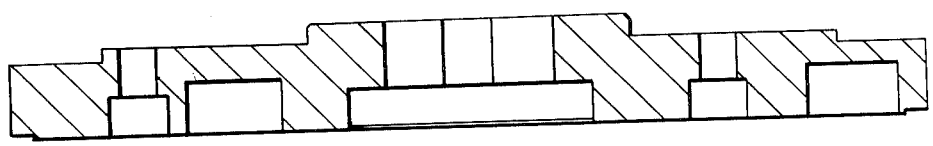
FIGURE 29 is a vertical section of the cam shown in FIGURE 28.

A lever 64 pivoted about a horizontal axis 65 on the plate 57 has on its free end a roller 66 co-operating with the corresponding cam 33 on the main shaft. As shown in FIGURE 26 the cam 33 is circular over the greater part of its periphery but has at one point a recess 33′ into which the roller 66 moves to release the clamping means for the platens while the platens are moved from one operative station to the next, the circumferential length of the recess being sufficient to allow the platen movement to be completed before the clamping means are again applied as the roller 66 rides out of the recess on to the periphery of the cam. The lever carries an adjustable vertical tappet 67, and adjacent to its free end it engages a boss on the free end of a second lever 68 pivoted at 69 on the plate and carrying a second tappet 71. The positions of the tappets and the relative lengths of the levers are such that when the lever 64 is actuated by the cam, both tappets are moved upwardly through the same distance. Each tappet operates a clamp shown in FIGURE 15.

A telescopic clamping plunger 73 which engages the underside of a flange or runner 25 on the platen and clamps it against an overhung guide flange 74 on the base of the machine is actuated by an aligned plunger 75 through Belleville washers 76 which provide sufficient clamping pressure but avoid overloading. The lower plunger is actuated by a tappet 67 or 71 and in the released position of the platen there is a clearance of the order of ten thousandths of an inch between the upper end of the plunger 73 and the flange or runner 25 on the platen. When the tappet is moved upwards it first takes up that clearance, then lifts the platen through the same distance, and then compresses the Belleville washers to clamp the platen against the stationary guide flange 74.

As shown in FIGURE 14, each of the cross plates 57 conveniently carries four clamping tappets located at opposite sides of the plate and two locating plungers 56, 58, the centre line of the plate lying below the meeting ends of two platens in their operative positions so that two clamping tappets and one locating plunger co-operate with one platen and the other two clamping tappets and the other locating plunger co-operate with the other platen.

The mechanism for returning the platens through the base of the machine is shown in FIGURE 16 and FIGURE 17. At the unloading end of the machine the angularly movable claw described below takes a platen from its guides, inverts it, and brings it into alignment with guides 81 extending through the base of the machine and along which they are moved by spring-loaded pivoted fingers 82 operated by a compressed air cylinder 83 supplied with air through a valve controlled by a micro-switch (not shown) actuated by a cam or finger on the main shaft. With the normal cycle there will be three platens in the lower position at any time, one just having been brought down, one in transit, and one about to be taken up, and the stroke of the air cylinder will be ⅓ that of the total travel of the platens.

FIGURE 16 also shows the screw swarf conveyor 18 which is driven from the main shaft through a chain and chain sprocket 84, and it also shows a coolant pump 85 driven by an electric motor 86.

The mechanism for transferring the platens between the guides on the upper face of the base and the return track is shown in FIGURES 18, 19, 20 and 21 which show the mechanism at the loading end. A cast-iron claw 87 of the form shown in end view in FIGURE 19 is rotatably mounted on the main shaft, and has at opposite ends guides 88 to receive the flanges on a platen. A boss 89 keyed on the main shaft has a projection 91 on which is pivoted a lever 92 having on its free end a roller 93. At an intermediate point in its length a notch 94 is formed in the outer edge of the lever. The lever is loaded by a spring-pressed plunger 95 which urges the roller into engagement with a stationary internal cam ring 96 of the form shown in FIGURE 18. The cam ring is secured to a stationary part by bolts 97 passing through arcuate slots 98 in the ring so that the angular position of the cam ring can be accurately adjusted. An internal ring 99 in the claw has two diametrically opposed inwardly projecting teeth 101 in the same plane as the lever 92.

The boss 89 and the lever rotate with the main shaft and when the cam ring allows the lever to move outwardly the notch 94 in the lever engages with one of the teeth 101 in the claw so that the claw is picked up and is rotated with the shaft through 180°. The cam then moves the lever inwardly and disengages the notch from the tooth and the movement of the claw is arrested.

While the claw is stationary a platen is moved onto its lower end by the platen return mechanism and the subsequent angular movement of the claw through 180° takes the platen up into alignment with the upper guides and it is picked up and moved on to the guides by the transfer mechanism described above.

Location plungers controlled by an arm mounted on the main shaft may be provided for holding the claw positively in each of its rest positions.

Spring-loaded plungers indicated at 102 in FIGURE 19 may be provided in the guides on the claw to engage with the platen and brake its movement into the claw. The braking effect can be varied by selection of the number and loading of the plungers.

A similar claw is provided at the other end of the machine for transferring the platens from the upper guides to the return mechanism, and as they are both operated by the main shaft, their movements are synchronised.

The main shaft also actuates all the slides carrying the unit heads by which operations are performed on the work-pieces carried by the platens. One form of drive is shown in FIGURE 22.

A shaft 105 coupled to a transverse shaft driven by one of the bevel gears 34 on the main shaft carries a drum cam 106 having a helical slot 107 to receive a roller on a slide for moving the slide towards and away from the platens. The drum is freely rotatable on the shaft to which it is drivably coupled by a boss 108 keyed on the shaft and having a radial projection 109 which is received in a radial notch in a flange 110 on the end of the drum. If the slide at any particular station is not in use, the boss 108 can be removed and reversed so that the projection 109 is clear of the notch in the drum and the drum is not driven.

Figure 22:
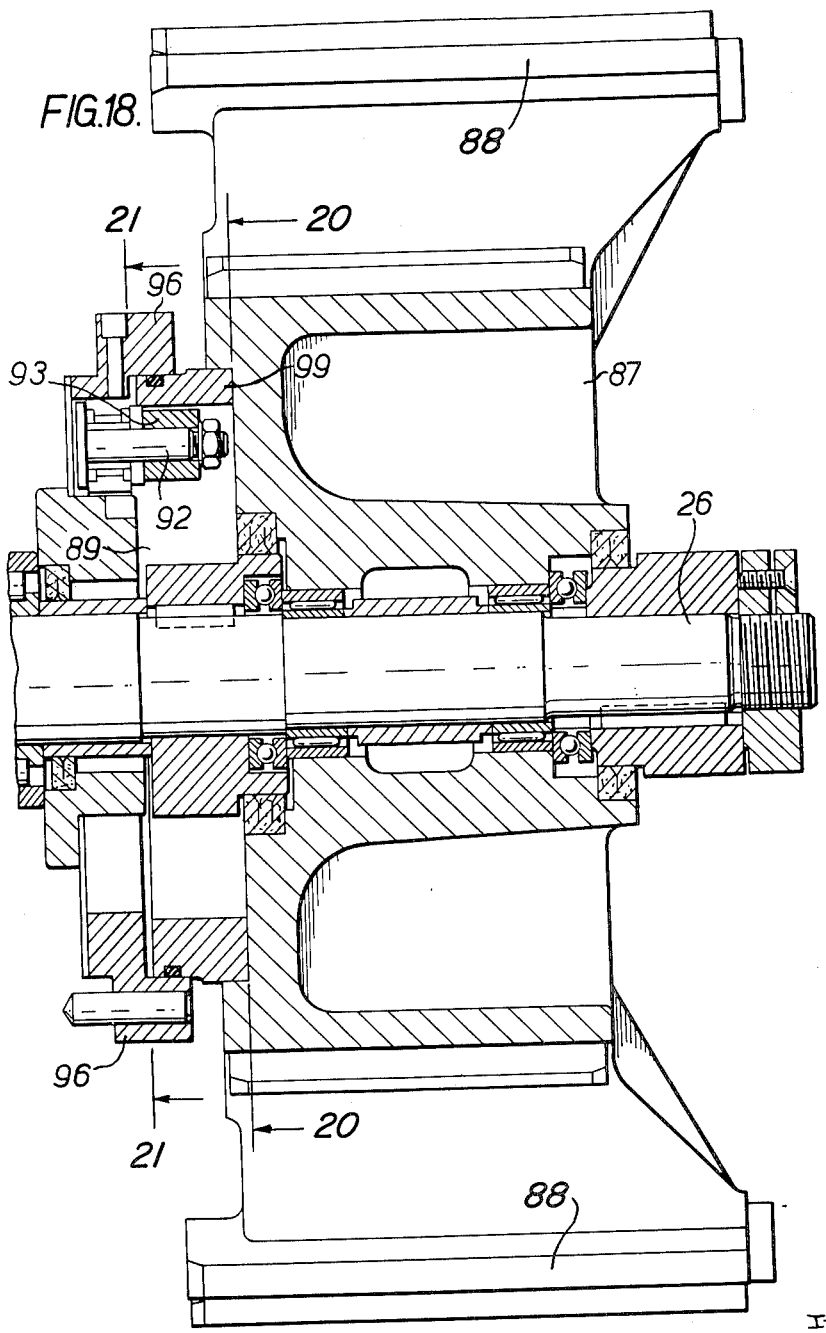
FIGURE 22 is a longitudinal section of a drive for one of the slides.

The actual cam is preferably a sleeve detachably mounted on a drum as shown in FIGURE 22 and cams can be selected to give any desired movement to a slide. For example, a cam may be arranged to provide a fast feed up to the work, a slow feed during a cutting or other operation, and a fast return.

Figure 23:
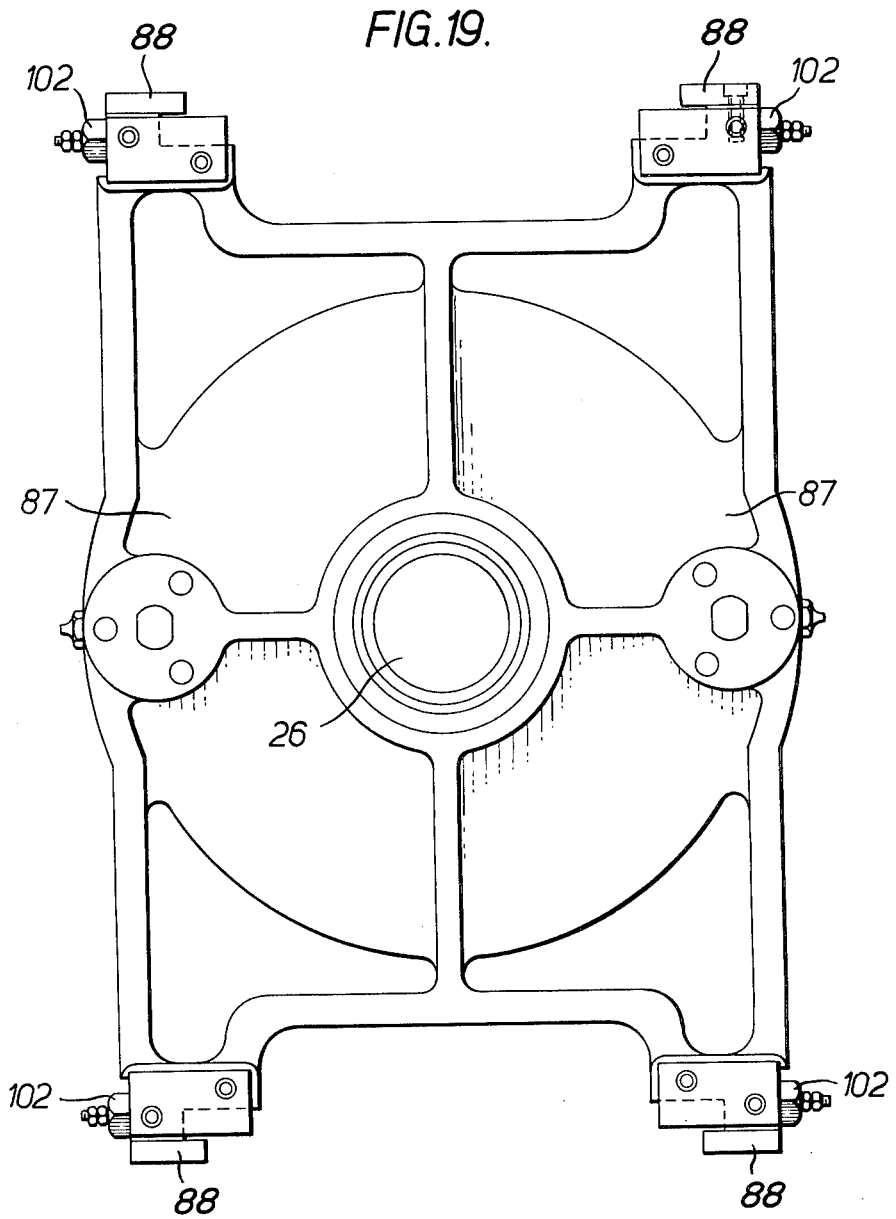
FIGURE 23 is a fragmentary view of a modification for use where there is a dead stop for the slide.

FIGURE 23 shows a modification for use where the slide moves up to a dead stop as for example in a spot facing operation. In this arrangement one of the nuts normally employed for securing the boss 108 on the shaft is replaced by a housing 111 for Belleville washers 112 located between the housing and a ring 113 slidable in the housing and bearing against the end of the boss, so that the cam drum is permitted a limited degree of end float. The loading of the Belleville washer is sufficient to overcome any cutting tool pressure but when the slide engages the dead stop the cam drum can move backwards against the action of the Belleville washers while maintaining the slide against the stop so that there is no undue strain put on the cam or follower.

Figure 24:
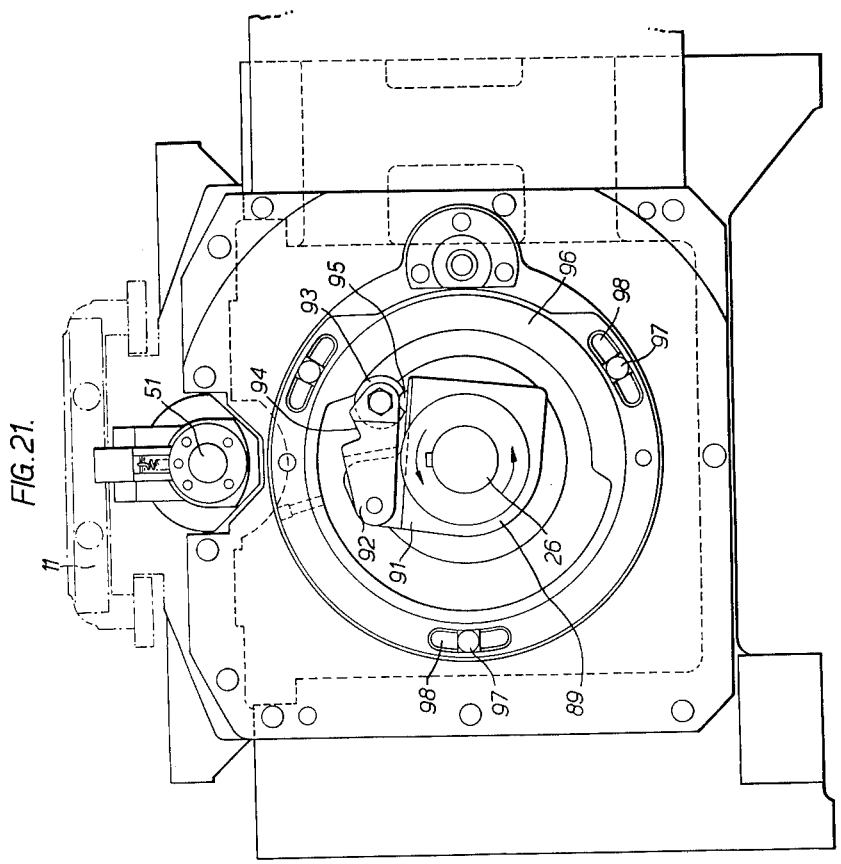
FIGURE 24 is a longitudinal section of a slide carrying a readily removable and interchangeable top slide.
Figure 25:
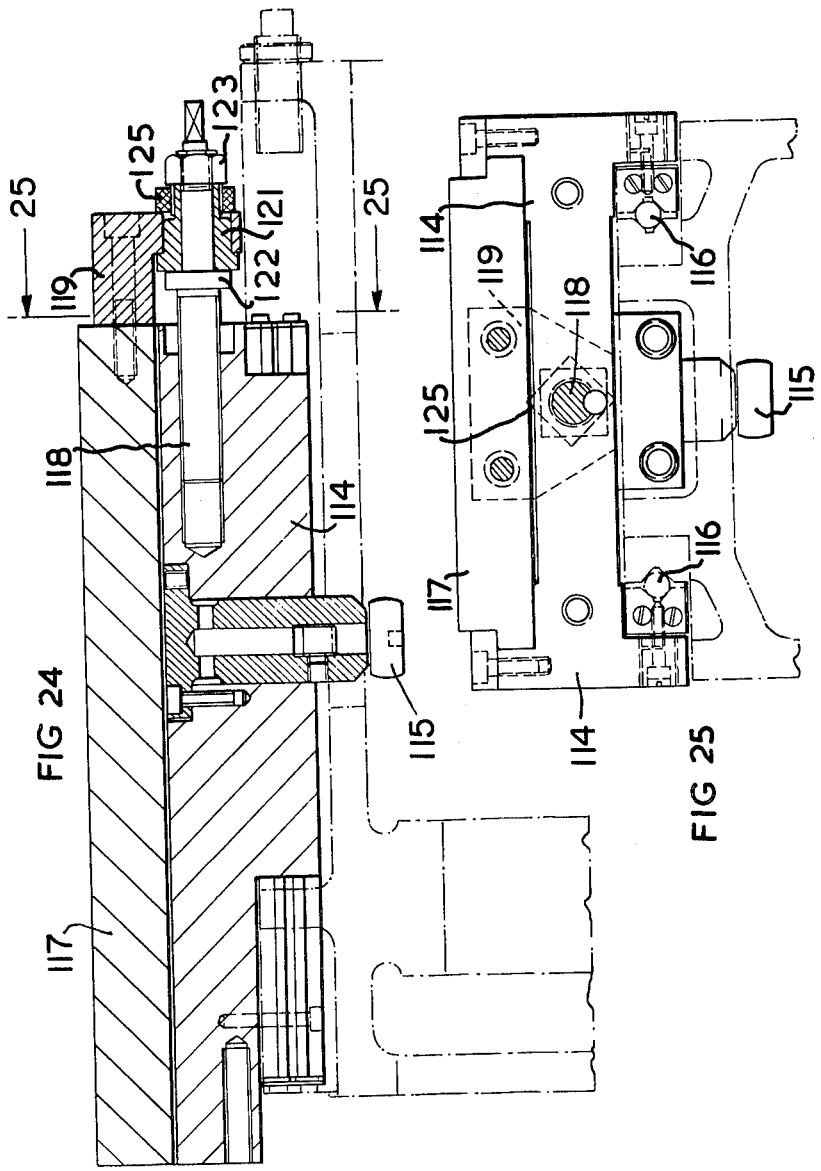
FIGURE 25 is an end view of the slide shown in FIGURE 24 taken on the line 25—25 of FIG. 24.

FIGURES 24 and 25 show a slide 114 carrying a roller 115 for engagement with a cam groove in a drum cam of the form shown in FIGURE 22. The slide is guided on balls or rollers 116 running in co-operating V grooves in the slide and in a stationary part to reduce friction. The slide carries an adjustable top tool-carrying slide 117 which is readily removable for tool changing. The top slide is longitudinally adjustable on the main slide by means of a screwed spindle 118 adjustably screwed into the main slide and passing through a bracket 119 fixed to the top slide. A sleeve 121 of square cross-section is mounted on the spindle on the outer side of a shoulder 122 and is received in an opening of square cross-section in the bracket. The sleeve is held against the shoulder 122 by a nut 123 screwed on to the outer end of the spindle. The bracket is held against a radial flange 124 on the sleeve by a nut 125 of square cross-section which is of slightly smaller dimensions than the opening in the bracket and is screwed on to a spigot extension of the sleeve. Normally the square nut 125 is in the position shown in FIGURE 25, and when it is desired to remove the top slide it is only necessary to turn the nut 125 back through 45°. The bracket can then pass freely over the nut and the top slide can be withdrawn. When the top slide is replaced the bracket is returned against the flange on the sleeve and is locked by tightening the nut through 45° into the position shown in FIGURE 25. There is no movement of the adjusting spindle so that the position of the top slide on the main slide is not affected.

If desired the slide may be loaded by a spring to take up any back-lash in the operating mechanism.

The complete cycle of operations of the machine will be readily followed.

Individual motors driving the spindles of the work-heads and motors driving pumps for lubricant and coolant run continuously when the machine is in operation.

Actuation of a main switch sets the indexing motor 46 in operation and this motor starts rotation of the drum cam 45 and the associated face cam 134. The locating plungers for the platens are withdrawn and the platens are moved forwardly through a distance equal to the spacing between successive stations. When platen transfer has been completed the locating plungers are re-inserted and the switch 130 stops the index motor 46 and a further switch (not shown) starts the motor driving the main shaft which operates the clamping means for the platens through the cams 33 and, through the bevel gears 34, brings in the slides 12 carrying the work-heads which perform operations on components carried by the platens, the slides then being returned to their initial positions.

During these operations the claws at the ends of the machine have been actuated to transfer a platen at the loading end from the return guides in the base of the machine to the upper guides and to transfer a platen at the other end of the machine from the upper guides to the return guides, and the air cylinder 83 has been energised to feed platens on the return guides towards the loading end.

When the main shaft has completed a revolution the motor driving that shaft is stopped and the index motor is started again to allow the next cycle to begin.

What is claimed is:

1. An in-line transfer machine comprising a base having loading and unloading points at opposite ends thereof, longitudinal guides on the upper surface of the base extending between said loading and unloading points, a driven main shaft extending longitudinally within the base, a series of work-receiving platens slidably mounted on said guides, means controlled by the main shaft for moving said platens successively step-by-step along said guides from the loading point at one end of the machine to the unloading point at the opposite end, slides adapted to carry unit work heads located on the base on each side of the guides and movable towards and away from the platens, means located within the base and actuated by the main shaft for effecting the movements of the slides, clamping means located within the base and controlled by the main shaft for positively locating and clamping the platens in successive longitudinally spaced stations on the guides while operations are performed on work-pieces mounted on the platens by the unit work-heads on the slides, means at the unloading end of the machine actuated by the main shaft for transferring the platens successively from the guides to a position at the unloading end clear of said guides after operation on respective work pieces carried by said platens having been completed, and means actuated by the main shaft for engaging and returning said platens from said position to said loading point.

2. An in-line transfer machine as in claim 1 wherein means for moving the platen at the loading end during each rotation of the main shaft through a distance equal to the spacing between platen stations comprise a drum cam rotatably mounted on the main shaft, mechanism transmitting movement from said cam to the platen, an independent motor for rotating said cam through one revolution, and means on the main shaft for controlling energisation of said motor in synchronism with the main shaft, the movement of said platen moving all the other platens through the same distance.

3. An in-line transfer machine as in claim 2 wherein said mechanism transmitting movement from said cam to the platen comprises a carriage slidably guided on the base for movement in a direction parallel to the movement of the platens, a spindle mounted in said carriage for longitudinal movement therein, rack teeth on said spindle, a stationary rack on the base parallel to said spindle, a pinion rotatably mounted in said carriage and meshing with the rack teeth on the spindle and with the stationary rack, a roller mounted on said carriage and engaging with said drum cam, and a spring-loaded finger mounted on said spindle for engagement with the platen, the arrangement being such that the spindle and platen move through a distance equal to twice the movement imparted to the carriage by the cam.

4. An in-line transfer machine as in claim 1 wherein said platens have on each side flanges engaging under laterally projecting flanges on said guides and said means for locating and clamping the platens in successive longitudinally spaced stations on the guides comprise separate locating plungers and clamping members at each station, a longitudinal shaft for actuating all said plungers simultaneously, means including a cam on the main shaft actuating said longitudinal shaft, and longitudinally spaced cams on the main shaft actuating said clamping members simultaneously.

5. An in-line transfer machine as in claim 4 wherein said clamping members comprise spaced plungers adapted to bear on the underside of the flanges on the platens, each plunger comprising two telescopic parts between which Belleville washers are located to prevent overloading.

6. An in-line transfer as in claim 4 wherein the means actuating said longitudinal shaft comprise a lever arm mounted on said longitudinal shaft for limited relative angular movement, resilient means resisting said relative angular movement, and a cam on the main shaft co-operating with said lever arm.

7. An in-line transfer machine as in claim 1 wherein said means for moving the slides carrying the unit work heads towards and away from the platens comprise a transverse shaft for each slide, a drum cam on said transverse shaft, a roller on the slide co-operating with said drum cam, and a bevel gear drive coupling said transverse shaft to the main shaft.

8. An in-line transfer machine as in claim 1 comprising guides located within the base of the machine and extending between said position at the unloading end of the machine to a second position at the loading end of the machine, said guides being adapted to receive said platens for the return movement thereof to said loading point, and means at the loading end of the machine actuated by the main shaft for transferring platens between said second position to the guides on the upper surface of the base.

9. An in-line transfer machine as in claim 8 wherein said guides on the upper surface of the base and the guides within said base are diametrically opposed to each other on opposite sides of said main shaft and wherein said transfer means at each end of the machine comprises a claw member rotatably mounted on the main shaft, diametrically opposed means on said claw member for receiving a platen, cooperating engaging means on the main shaft and on each claw member for moving said claw member angularly through 180° during each cycle of operations of the machine to move each platen from one set of guides to the other set, and a stationary cam ring for controlling said engaging means.

10. An in-line transfer machine as in claim 8 including fingers cooperating with the platens upon movement thereof to the first mentioned position, and a compressed air cylinder actuating said fingers to move the platens along the guides within the base towards the second position at the loading end of said guides.

References Cited by the Examiner

UNITED STATES PATENTS

| | | | |
|---|---|---|---|
| 556,415 | 3/1896 | Hartness | 82—36.1 |
| 2,028,008 | 1/1936 | Peyinghaus | 29—33.12 |
| 2,073,111 | 3/1937 | Lingren | 29—28.3 |
| 2,531,647 | 11/1950 | Roesen | 29—21.07 XR |
| 2,590,157 | 3/1952 | Corbett | 214—1 XR |
| 2,982,004 | 5/1961 | Cross | 29—33 |
| 3,088,572 | 5/1963 | Rively | 198—19 |
| 3,094,767 | 6/1963 | Grimm | 29—33.9 |
| 3,125,204 | 3/1964 | Loven | 198—19 |

FOREIGN PATENTS

| | | |
|---|---|---|
| 647,828 | 9/1962 | Canada. |
| 1,162,766 | 4/1959 | France. |

RICHARD H. EANES, JR., *Primary Examiner.*

D. M. SCHMIDT, *Examiner.*